3,527,672
METHOD OF PRODUCING L-LYSINE

Koji Kubota, Isamu Maeyashiki, Teruo Shiro, and Katsuya Noboru, Kanagawa-ken, Japan, assignors to Ajinomoto Co., Inc., Tokyo, Japan
No Drawing. Continuation-in-part of application Ser. No. 644,787, June 9, 1967. This application Oct. 28, 1969, Ser. No. 871,961
Claims priority, application Japan, June 15, 1966, 41/38,757
Int. Cl. C12d *13/10*
U.S. Cl. 195—29   3 Claims

ABSTRACT OF THE DISCLOSURE

When auxotrophic mutant strains of *Brevibacterium lactofermentum* No. 2256–213, which require threonine, isoleucine and valine for their growth, are cultured on an otherwise conventional medium, L-lysine accumulates in the medium.

---

This application is a continuation-in-part of our copending application Ser. No. 664,787, filed on June 9, 1967, and now abandoned.

This invention relates to the fermentative production of amino acids, and particularly to the preparation of L-lysine.

L-lysine is one of the amino acids necessary for human and animal nutrition and has been used recently for enrichment of foods and animal feed.

We have found that mutant strains of *Brevibacterium lactofermentum* No. 2256 (ATCC No. 13869), which require threonine, isoleucine and valine for their growth, produce and accumulate L-lysine in economically useful amounts when cultured aerobically on otherwise conventional culture media which contain threonine, isoleucine and valine. The concentration of L-lysine (as hydrochloride) may become as high as 4–5.2 grams per deciliter.

The mutant strains are readily obtained in a conventional manner by exposing vegetative cells of the parent (*Brevibacterium lactofermentum* No. 2256) to ultraviolet light, to X-ray, or to gamma rays, and by screening the irradiated material for its response to threonine, isoleucine and valine. Suitable mutant strains have also been obtained by contacting the parent strain with sodium nitrite solution in a well known manner. We call these mutant strains *Brevibacterium lactofermentum* No. 2256–213. They are available without restriction from the American Type Culture Collection in Rockville, Md. (ATCC No. 21086).

The culture media employed in our invention may be entirely conventional except for their content of threonine, isoleucine, and valine. They must contain an assimilable carbon source, an assimilable nitrogen source, and the usual minor nutrients. Suitable carbon sources include carbohydrates, such as glucose, fructose, maltose, sucrose, xylose, starch hydrolyzate, molasses, and organic acids. The concentration of the carbon source in the medium should preferably be controlled to 5–16% glucose equivalent.

A nitrogen source is employed as nutrient for the propagation of the microorganisms and as a source of amino groups for L-lysine. Nitrogen may be provided by ammonium salts of inorganic or organic acids such as $NH_4Cl$, $(NH_4)_2SO_4$, $(NH_4)_2CO_3$, and by ammonia in aqueous solution or in the gaseous state, which may be used simultaneously for pH control in a known manner.

Supplemental inorganic nutrients required include the essential inorganic ions available from potassium phosphate, magnesium sulfate, manganese sulfate, zinc sulfate, ferrous sulfate, sodium chloride and carbonate. Organic growth promoting agents which improve the yield and the rate of production of L-lysine include vitamins and fatty acids, and may be added to the culture medium in the form of substances which yield the active agent under the conditions of fermentation, such as peptone, yeast extract, corn steep liquor, soybean protein hydrolyzate, and various other extracts of vegetal and animal tissues, well known themselves.

Threonine, isoleucine and valine should be present in the culture medium in a preferred concentration of 10 to 60 mg./dl., 5 to 20 mg./dl. and 10 to 40 mg./dl. respectively. Addition of methionine to the culture medium is also necessary for increasing the accumulation of L-lysine. The preferred concentration of methionine in the medium is from 100 mg./dl. to 400 mg./dl.

For a good yield of L-lysine, the fermentation should be carried out with aeration and agitation in order to supply sufficient oxygen to the broth. Best yields of L-lysine cannot be obtained unless the hydrogen ion concentration in the culture medium is controlled between 5 and 9. Aqueous ammonia, gaseous ammonia, caustic alkali, calcium carbonate, hydrochloric acid, sulfuric acid, nitric acid and other bases or acids may be added to the nutrient medium as required to maintain the desired pH range. For best results, the temperature of the broth should be held between 24° and 37° C. during fermentation. The fermentation is normally carried out for 2 to 4 days.

The recovery of L-lysine from the nutrient medium may follow known methods. The bacterial cells may be removed by filtration or by centrifuging, and L-lysine may be recovered by employing ion exchange resins in combination with evaporation under reduced pressure or precipitation.

The following examples are further illustrative of the invention, but it will be appreciated that the invention is not limited thereto.

EXAMPLE 1

An aqueous culture medium was prepared to contain 13% glucose, 5% $(NH_4)_2SO_4$, 0.1% $KH_2PO_4$, 0.04% $MgSO_4.7H_2O$, 2 p.p.m. $Fe^{++}$, 2 p.p.m. $Mn^{++}$, 12 mg./dl. amino acid powder (total nitrogen: 0.07 g./g.), 50 mg./dl. DL-threonine, 300 mg./dl. DL-methionine, 10 mg./dl. L-isoleucine, 30 mg./dl. L-valine, 30 µg./dl. biotin, 50 µg./dl. thiamine hydrochloride and 5% $CaCo_3$. 20 milliliter batches of the solution were placed in 500 ml. shaking flasks, and were sterilized by steam in the flasks at 110° C. for 5 minutes. They were then inoculated with *Brevibacterium lactofermentum* No. 2256–213 (ATCC No. 21086), which had previously been cultured on bouillon slants for 24 hours at 31.5° C. The fermentation was carried out at 31.5° C. with shaking for 80 hours. At the beginning of the fermentation, the pH value of the medium was 7.2 4.56 grams per deciliter of L-lysine (as hydrochloride) were found in the broth.

The microbial cells and calcium salts were removed from one liter of the broth by filtration, and the solution was adjusted to pH 3.5 with concentrated hydrochloric acid. The solution was passed over a column packed with a strong cation exchange resin of the ammonium type. The column was washed with water and the L-lysine was then eluted with 2 N ammonium hydroxide solution. The eluate was concentrated to about 200 ml., adjusted to pH 5.6, and further concentrated to 100 ml. 37.1 g. crystals of crude L-lysine chloride dihydrate were precipitated from the solution by cooling.

EXAMPLE 2

An aqueous culture medium was prepared to the following composition: 16 g./dl. sweet-potato starch hydrolyzate (glucose equivalent), 5 g./dl. NH$_4$)$_2$SO$_4$, 0.1 g./dl. KH$_2$PO$_4$, 0.04 g./dl. MgSO$_4$·7H$_2$O, 0.001 g./dl. FeSO$_4$, 0.001 g./dl. MnSO$_4$ 2.5 ml./dl. soybean protein hydrolyzate (total nitrogen: 2.2 g./dl.; 17.5 mg. threonine, 18.5 mg. isoleucine and 24.5 mg. valine are contained in 2.5 ml. of the soybean protein hydrolyzate), 5 mg./dl. DL-threonine, 300 mg./dl. DL-methionine, 20 μg./dl. biotin, 50 μg./dl. thiamine hydrochloride, and 5 g./dl. calcium carbonate.

The fermentation was carried out with *Brevibacterium lactofermentum* No. 2256–213 as described in Example 1. After 96 hours cultivation, 5.20 g./dl. of L-lysine (as hydrochloride) were found in the broth.

EXAMPLE 3

An aqueous culture medium was prepared to the following composition: 13 g./dl. glucose, 5 g./dl.

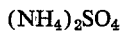

0.1 g./dl. KH$_2$PO$_4$, 0.04 g./dl. MgSO$_4$·7H$_2$O, 2 p.p.m. Fe$^{++}$, 0.5 ml./dl. soybean protein hydrolyzate (as used in Example 2), 50 mg./dl. DL-threonine, 150 mg./dl. methionine, 20 μg./dl. biotin, 50 μg./dl. thiamine hydrochloride, 5 g./dl. calcium carbonate, and isoleucine and valine in various amounts mentioned in the following Table 1.

The fermentation was carried out with the same microorganisms and under the same conditions as in Example 1.

The amounts of L-lysine produced in the broth at various concentrations of isoleucine and valine are listed in Table 1.

TABLE 1

| Conc. of isoleucine (mg./dl.) | Conc. of valine (mg./dl.) | L-lysine (hydrochloride) (g./dl.) | | | |
|---|---|---|---|---|---|
| | | 10 | 20 | 30 | 40 |
| 5 | | 1.77 | 3.16 | 3.29 | 1.68 |
| 10 | | 2.38 | 4.08 | 4.12 | 1.89 |
| 20 | | 1.72 | 2.83 | 3.34 | 2.43 |
| 30 | | 0.96 | 2.17 | 2.13 | 1.20 |

NOTE.—The amounts of valine and isoleucine mentioned in this table include valine and isoleucine supplied from soybean protein hydrolyzate.

EXAMPLE 4

Aqueous media as mentioned in Example 3, but containing 10 mg./dl. of isoleucine, 30 mg./dl. of valine, and DL-threonine in amounts mentioned in the following Table 2, were prepared.

The fermentation was carried out for 72 hours as in Example 1. The amounts of L-lysine produced in the broth at each concentration of DL-threonine are listed in Table 2.

TABLE 2

| DL-threonine added (mg./dl.): | L-lysine produced (g./dl.) |
|---|---|
| 10 | 2.66 |
| 20 | 4.01 |
| 30 | 3.97 |
| 40 | 3.99 |
| 50 | 3.88 |
| 60 | 3.56 |

What we claim is:
1. A method of producing L-lysine which comprises:
   (a) culturing an auxotrophic mutant strain of *Brevibacterium lactofermentum* No. 2256 (ATCC No. 13869) on an aqueous nutrient medium under aerobic conditions, while maintaining the pH of the culture medium within a range of from 5 to 9 until a substantial amount of L-lysine is accumulated in said medium,
      (1) said strain requiring threonine, isoleucine and valine for the growth thereof, and
      (2) said medium including an assimilable carbon source, an assimilable nitrogen source, an organic nutrient, essential inorganic ions, threonine, isoleucine and valine, and
   (b) recovering said L-lysine from said medium.
2. A method as set forth in claim 1, wherein said threonine, isoleucine and valine are present in said medium in respective amounts of 20 to 60 mg./dl., 5–20 mg./dl. and 10–40 mg./dl.
3. A method as set forth in claim 1, wherein said mutant strain is *Brevibacterium lactofermentum* No. 2256–213 (ATCC No. 21086).

References Cited

Developments in Industrial Microbiology, vol. 7, chapters 3 and 4 (pp. 16 to 34), 1966.

LIONEL M. SHAPIRO, Primary Examiner